(12) United States Patent
Mohanty et al.

(10) Patent No.: US 7,636,577 B2
(45) Date of Patent: Dec. 22, 2009

(54) METHOD AND APPARATUS TO IMPLEMENT EFFICIENT PAGING IN A WIRELESS NETWORK

(75) Inventors: Shantidev Mohanty, Hillsboro, OR (US); Muthaiah Venkatachalam, Beaverton, OR (US); Sameer Pareek, Portland, OR (US)

(73) Assignee: Intel Corporation, Santa Clara, CA (US)

( * ) Notice: Subject to any disclaimer, the term of this patent is extended or adjusted under 35 U.S.C. 154(b) by 521 days.

(21) Appl. No.: 11/263,410

(22) Filed: Oct. 31, 2005

(65) Prior Publication Data
US 2007/0099635 A1 May 3, 2007

(51) Int. Cl.
*H04W 68/00* (2009.01)

(52) U.S. Cl. .......... 455/458; 455/422.1; 455/426.1; 455/432.1; 455/434; 455/435.1; 370/328; 370/329

(58) Field of Classification Search .......... 455/458, 455/422.1, 426.1, 432.1, 434, 435.1; 370/328, 370/329
See application file for complete search history.

(56) References Cited

U.S. PATENT DOCUMENTS

| | | | | |
|---|---|---|---|---|
| 6,584,313 | B2 * | 6/2003 | Butler et al. | 455/434 |
| 2005/0128990 | A1 | 6/2005 | Eom et al. | |
| 2005/0197125 | A1 * | 9/2005 | Kang et al. | 455/439 |
| 2006/0009242 | A1 * | 1/2006 | Ryu et al. | 455/458 |
| 2006/0089161 | A1 * | 4/2006 | Kim et al. | 455/458 |

FOREIGN PATENT DOCUMENTS

| EP | 01571785 A2 | 9/2005 |
|---|---|---|
| WO | WO-2006070993 A1 | 7/2006 |

OTHER PUBLICATIONS

Barber, P., et al., "MSS Idle Mode", *IEEE 802.16 Broadband Wireless Access Working Group*, (Mar. 18, 2004),1-11.
Venkatachalam, M., et al., "Multi-Radio Paging", Url:www.ieee802.org/21/doctree/2006-11_meeting_docs/21-06-0747-00-0000-[d]e%20mode%20and%20paging.ppt>,(Mar. 20, 2007).

* cited by examiner

*Primary Examiner*—Rafael Pérez-Gutiérrez
*Assistant Examiner*—Liton Miah
(74) *Attorney, Agent, or Firm*—The Law Offices of John C. Scott, LLC; John C. Scott

(57) ABSTRACT

Techniques are disclosed for achieving efficient paging in a wireless network. In at least one embodiment, paging is performed in a manner that achieves a balance between paging latency and paging signaling overhead.

26 Claims, 5 Drawing Sheets

METHOD AND APPARATUS TO IMPLEMENT EFFICIENT PAGING IN A WIRELESS NETWORK

TECHNICAL FIELD

The invention relates generally to wireless communication and, more particularly, to wireless networking.

BACKGROUND OF THE INVENTION

The IEEE 802.16 wireless networking standard includes an "idle mode" for wireless user devices that are not currently involved in active communication. The idle mode is designed to reduce power consumption within the wireless user devices of the network. User devices within a network that are in idle mode are tracked by the network using paging and location update procedures. This paging may be used to, for example, determine the location of a particular user device in a network and to establish a call involving the user device. While in idle mode, a user device does not maintain a continuous active connection with the network. Instead, a paging cycle is established during which the device will occasionally wake up to listen for paging activity in the network. If paging commands are received by the device during this listening time, the user device will act in accordance with the commands. There is a need for techniques to manage idle mode operations in a wireless network in an efficient manner.

DETAILED DESCRIPTION

Figure 1:
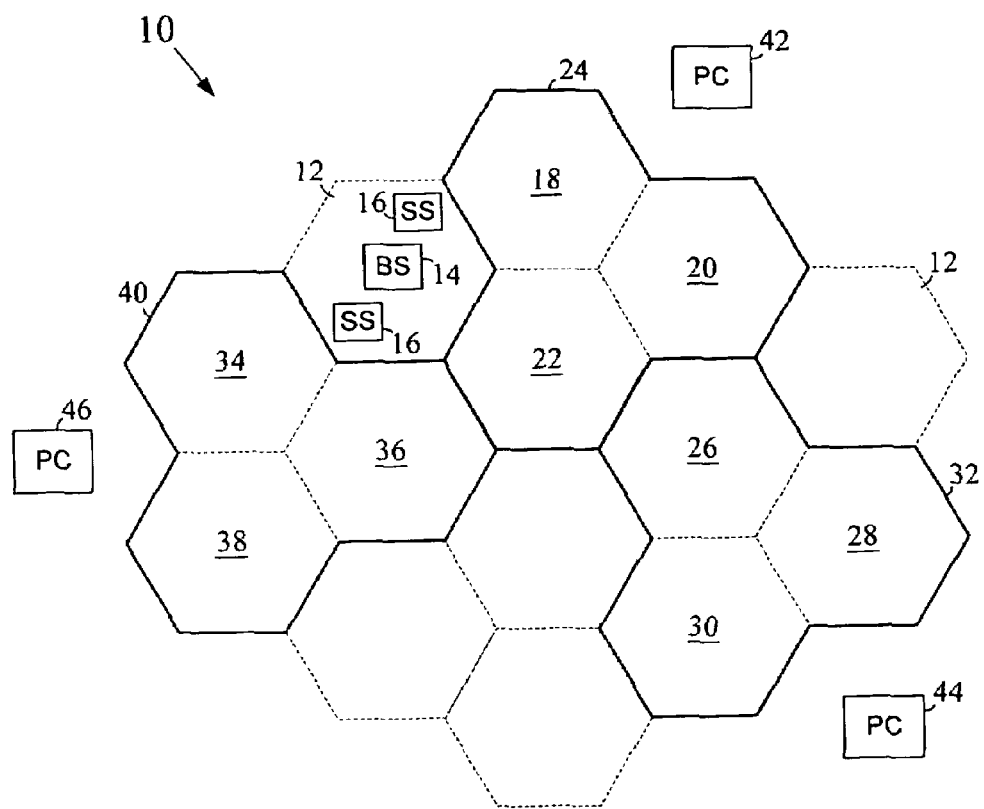
FIG. 1 is a diagram illustrating a wireless network arrangement that may incorporate features of the present invention.

In the following detailed description, reference is made to the accompanying drawings that show, by way of illustration, specific embodiments in which the invention may be practiced. These embodiments are described in sufficient detail to enable those skilled in the art to practice the invention. It is to be understood that the various embodiments of the invention, although different, are not necessarily mutually exclusive. For example, a particular feature, structure, or characteristic described herein in connection with one embodiment may be implemented within other embodiments without departing from the spirit and scope of the invention. In addition, it is to be understood that the location or arrangement of individual elements within each disclosed embodiment may be modified without departing from the spirit and scope of the invention. The following detailed description is, therefore, not to be taken in a limiting sense, and the scope of the present invention is defined only by the appended claims, appropriately interpreted, along with the full range of equivalents to which the claims are entitled. In the drawings, like numerals refer to the same or similar functionality throughout the several views.

FIG. 1 is a diagram illustrating an example wireless network arrangement 10 that may incorporate features of the present invention. As shown, the network arrangement 10 includes a plurality of cells 12 that collectively define a coverage area of the network. Each cell 12 includes a base station (BS) 14 that provides wireless access to the network for one or more subscriber stations (SSs) 16 within the cell. The cell 12 is representative of the coverage region of the corresponding BS 14. Each BS 14 may be coupled to a network backbone (not shown) which provides communication between the BSs 14. The backbone may also provide a connection to the Internet and/or some other larger network (e.g., the public switched telephone network (PSTN), etc.). The wireless BS 14 and the SSs 16 will each typically be configured in accordance with one or more wireless networking standards. In at least one embodiment, the wireless BS 14 and the SSs 16 are configured in accordance with the IEEE 802.16 wireless networking standard. Other standards may alternatively or additionally be supported.

The IEEE 802.16 standard includes an "idle mode" for SSs within a network. The idle mode is a mode that an SS may enter when it is not currently involved in active communication within the network. During idle mode, an SS is placed in a low power condition for most of the time, thereby conserving stored energy resources within the unit. Procedures are defined that allow an SS in idle mode to initiate and respond to requests to establish new connections within the network. When an idle mode SS becomes part of a new connection, the SS changes from idle mode to active mode. Idle mode allows SSs to conserve battery power and also contributes to a significant reduction in bandwidth usage in the air links of a network that would otherwise be required to transmit the control messages needed to maintain a connection.

When packets arrive for an SS in idle mode, the network utilizes "paging" to locate the SS and ask the SS to become active. Paging is performed using special management packets carried within management frames in the wireless network. The network maintains a rough estimate of the location of each idle mode SS by establishing a number of paging groups in the network. A paging group may consist of the coverage area (or cell) of one or more BSs in the network. For example, with reference to FIG. 1, cells 18, 20, and 22 may form a first paging group 24; cells 26, 28, and 30 may form a second paging group 32; cells 34, 36, and 38 may form a third paging group 40; and so on. Each paging group will typically have a paging controller (PC) 42, 44, 46 that manages paging and idle mode operations within the group. The paging controllers 42, 44, 46 may each be connected to the network backbone or be located in some area in the network. The geographic area covered by the BSs of a particular paging group is referred to as the paging area. When an SS goes into idle mode within a particular paging area, the corresponding PC makes an entry in its database to indicate that the idle mode SS is in its paging group. If the SS then moves into another paging group, the PC of the new paging group records the identity of the idle mode SS in its database and the PC of the old group deletes the SS from its database. In this manner, the location of the idle mode SS is known within the granularity of one paging area.

When a PC wishes to contact a particular SS, the PC causes an MOB-PAG-ADV (mobile paging advertisement) message to be broadcast by all of the BSs in the corresponding paging group. The PC may wish to contact the SS to, for example, request a location update, inform the SS about an incoming call, and/or for other reasons. In response to the MOB-PAG-ADV, the SS may transmit a MOB-PAG-RSP (mobile paging response). The MOB-PAG-RSP may, for example, provide an update of the SS's location, perform a procedure for network re-entry (e.g., to complete a connection), or perform some other action in response to the MOB-PAG-ADV.

Figure 2:
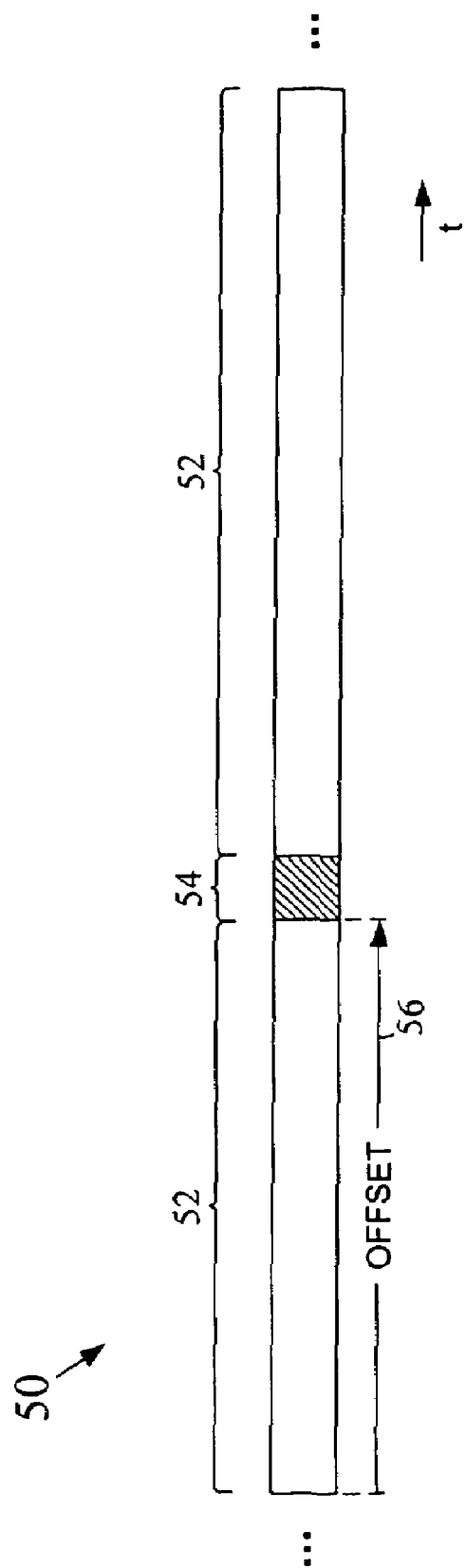
FIG. 2 is a timing diagram illustrating an example paging cycle for use within a paging group in a wireless network in accordance with an embodiment of the present invention.

Paging operations for a particular idle mode SS are performed in paging cycles in IEEE 802.16. FIG. 2 is a timing diagram illustrating an example paging cycle 50. As shown, the paging cycle 50 is divided into a paging unavailable interval 52 and a paging listening interval 54. During the paging unavailable interval 52, the SS is unavailable to the network. That is, the SS is in a low power state and is not capable of receiving or transmitting messages. During the paging listening interval 54, on the other hand, the SS listens for paging messages that are directed to it and, when detected, can respond to the messages. The paging listening interval 54 is usually of fixed duration and may be located anywhere within the paging cycle 50. The location of the paging listening interval 54 is identified by a paging offset value 56. The numerical values of paging cycle duration, paging listening interval duration, and paging offset may all be negotiated between a user and the BS (or PC) during idle mode initiation. The paging cycle 50 will continuously repeat for each idle mode SS.

During paging operations in a wireless network, it is generally desirable to reduce the amount of paging related signaling overhead in the network. That is, it is desirable to reduce the amount of paging related signaling that takes place between: (a) the PC and the associated BSs through the network backbone, and (b) the BSs and the associated SSs over the air link. It is also generally desirable to reduce the paging latency within the network. Paging latency is related to the time that elapses between the time a need for paging is realized by the PC and the time a paging response message is received from the corresponding SS. An SS may use one of the following two techniques to send its paging response (MOB-PAG-RSP) to the BS: (1) contend for the network medium to send the MOB-PAG-RSP to the BS or (2) use a pre-allocated access to the network medium to send the MOB-PAG-RSP message. It should be noted that the BS can allocate the SS access to the network medium in the MOB-PAG-ADV message. This can be implemented in several ways including, for example, by allocating ranging codes to the SSs (as described in IEEE 802.16). When an SS contends for network medium, the probability of successful transmission of the MOB-PAG-RSP from the SS to the BS decreases as the number of SSs contending for the medium increases. Keeping this in mind, one technique that may be adopted to reduce the signaling load associated with paging activity in a network is to aggregate several paging messages into a single MOB-PAG-ADV message. In this approach, paging messages corresponding to paging requests generated within a certain time interval are aggregated into a single MOB-PAG-ADV message. This time interval will hereinafter be referred to as the "paging generation interval." If too many paging messages are aggregated together, however, many SSs may contend for the network medium to send a response message to the PC within subsequent frames on the uplink. Due to the limited capacity of the network medium, many unsuccessful uplink transmissions may result, thereby increasing the paging latency. If only one SS is paged per paging message, on the other hand, paging latency will be reduced but overhead due to paging-related signaling will increase significantly. A strategy is needed for striking a balance between these two competing concerns (i.e., paging latency and paging signaling overhead). In one aspect of the present invention, techniques are provided that are capable of achieving such a balance.

In at least one embodiment of the present invention, idle mode users within a paging group are divided into one or more paging sets. Idle mode users within a paging set will all have the same paging offset value and may all be paged at the same time using an aggregated page massage. Each paging set will have a maximum number (N) of idle mode users that may become a part of the set. The length of the paging cycle and the duration of the paging listening interval will typically be known to the paging controller associated with a particular paging group. These values will usually be the same for all idle mode users in the network. The maximum number of paging sets within a paging group ($S_m$) may be calculated as:

$$S_m = \frac{PagingCycle}{PagingListeningInterval + ContentionReliefTime}$$

where ContentionReliefTime is a selected constant. The constant may be equal to, for example, the average time it takes users paged in the current paging group to contend and become a part of the network.

If the number of idle mode users within a paging set is N and it is assumed that an idle mode SS can be paged in the paging generation interval with a probability p, then the number of idle mode users that will be paged simultaneously is N×p. If there are K cells within a paging group and the idle mode users are uniformly distributed within the group area, the maximum number of users contending for the network medium in a cell to send a paging response will be N×p/K. As described previously, if too many idle mode users contend for a network medium within a given period, an increase in paging latency will result in the network. Therefore, in at least one embodiment of the present invention, the maximum number of idle mode users per paging set (N) is selected in a manner that ensures that paging latency does not exceed a tolerable upper limit (T). The limit T will apply whether or not pre-allocated access to the network medium is assigned to some of the idle mode SSs within the paging group by the BSs. The value of T may be a system parameter that is selected as part of the system design.

Figure 3:
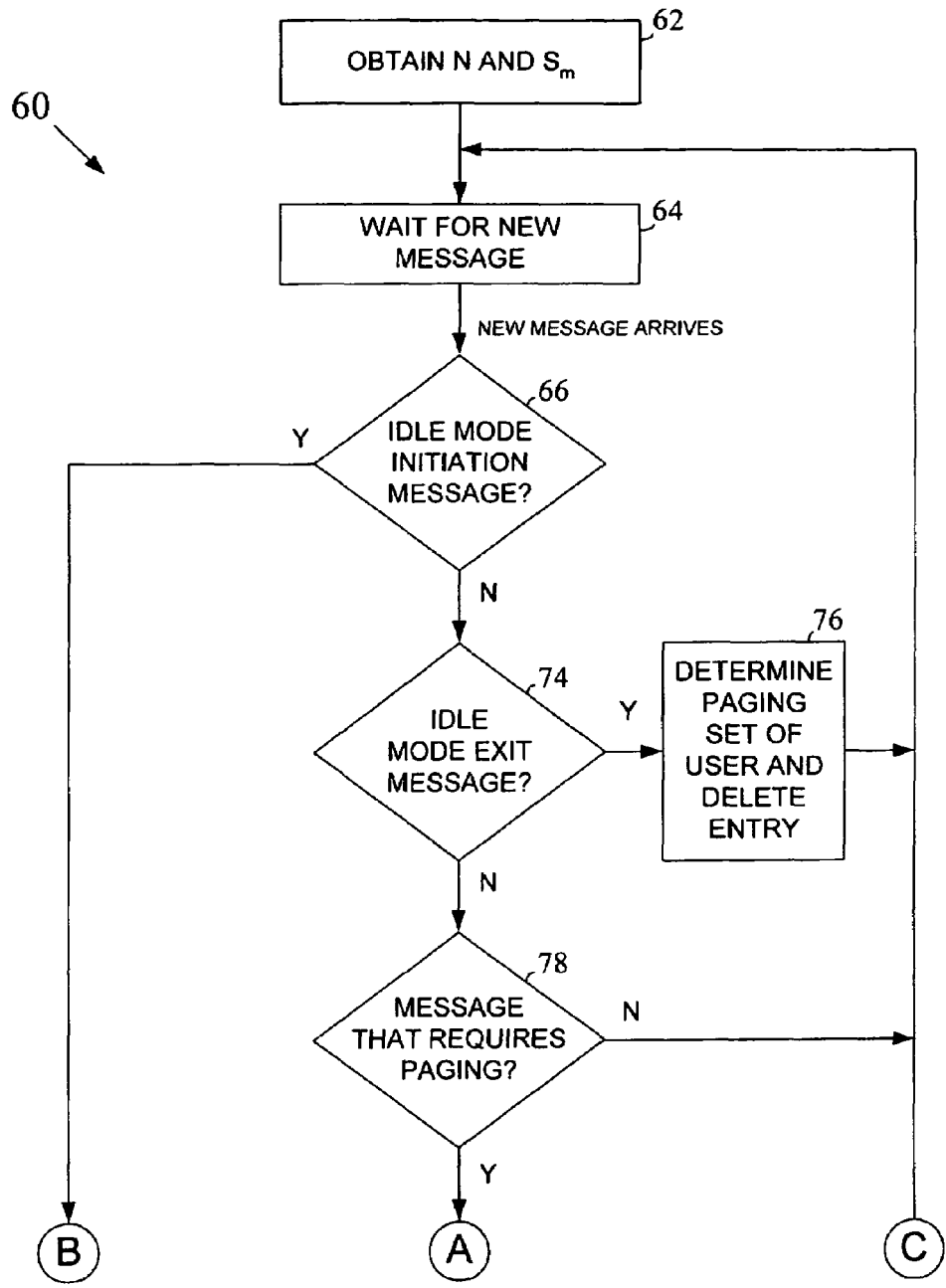
FIGS. 3 and 4 are portions of a flowchart illustrating an example method for managing idle mode operation in a wireless network in accordance with an embodiment of the present invention.
Figure 4:
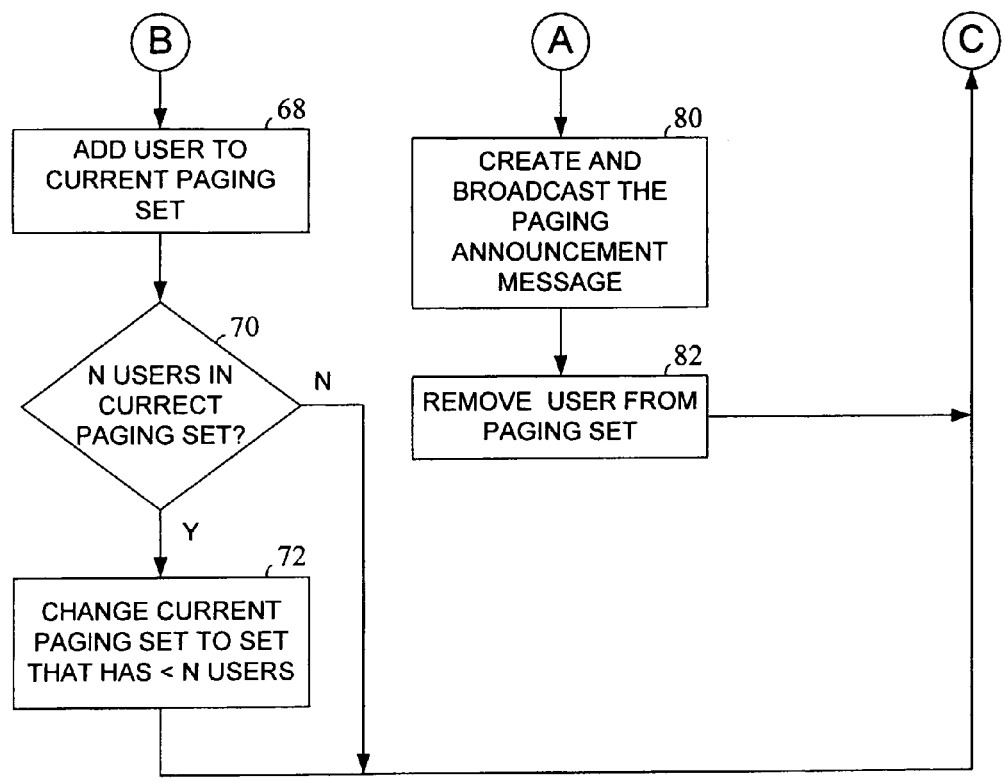

FIGS. 3 and 4 are portions of a flowchart illustrating an example method 60 for managing idle mode operation in a wireless network in accordance with an embodiment of the present invention. The method 60 may be implemented in connection with, for example, a paging controller or other control means associated with a paging group in a wireless network. First, values for a maximum number of paging sets within a paging group ($S_m$) and a maximum number of idle mode users per paging set (N) are obtained (block 62). As described above, the value of $S_m$ may be calculated based on a paging cycle and a paging listening interval being used in the wireless network. Also, the value of N may be determined in a manner that ensures that paging latency does not exceed a tolerable upper limit (T). For example, a value of N may be calculated so that N×p/K idle mode users contending within a cell will not result in a latency greater than T. Other techniques for obtaining these values may alternatively be used. At any one time, the paging sets within a paging group will be divided into two categories: namely, active paging sets and empty paging sets. The active paging sets are the paging sets that each include at least one idle mode user. The empty paging sets are the paging sets that do not currently include any idle mode users. The "current paging set" is a paging set that is designated by the PC to receive the next new idle mode user within the paging group.

During operation, the paging controller (or other control functionality) will wait for a new message to be received (block 64). When a new message arrives, it may be determined whether the message is an idle mode initiation message (block 66). An idle mode initiation message is a message indicating that a particular SS in the paging group is entering the idle mode. If the new message is an idle mode initiation message (block 66-Y), then the corresponding SS (or idle mode user) is added to the current paging set (block 68 in FIG. 4). The paging offset value corresponding to this set is then assigned to the SS. When the method 60 first starts up, there will typically be no idle mode users within any of the $S_m$ paging sets. In such a scenario, one of the paging sets is chosen as the current paging set and the SS associated with the first idle mode initiation message is placed therein.

After the new idle mode user has been added to the current paging set, it is next determined whether the maximum number of idle mode users (N) has been reached for the current paging set (block 70). If the maximum number of users has not been reached (block 70-N), then the method 60 returns to block 64 (FIG. 3) and waits for a new message to be received. If the maximum number of users has been reached (block 70-Y), on the other hand, a new current paging set will be selected (block 72). The procedures to select a new current paging set are as follows. If all of the active paging sets have the maximum number of idle mode users at this time, then one of the empty paging sets may be selected as the new current paging set. If one or more of the active paging sets has less than the maximum number of idle mode users at this time, then one of these active paging sets may be selected as the new current paging set. Other techniques for selecting the new current paging set may alternatively be used. As will be described in greater detail, an active paging set (other than the current paging set) may have less than N idle mode users if one or more of the idle mode users previously assigned to the set has left the idle mode or has moved from the paging group. After the new current paging set has been selected, the method 60 returns to block 64 and waits for a new message to be received.

If a new message received by a paging controller is not an idle mode initiation message (block 66-N), it may next be determined whether the message is an idle mode exit message (block 74). An idle mode exit message is a message indicating that a particular SS is leaving the idle mode. An idle mode exit message may be generated when, for example, an SS is entering the active mode to take part in an active communication connection or when the SS is leaving a current paging group for a new paging group (even if the SS is remaining within idle mode). When an idle mode exit message is detected (block 74-Y), the paging set of the corresponding SS within the paging group is determined and the associated entry is deleted (block 76). After the entry has been deleted, the method 60 may return to block 64 and wait for a new message to be received.

If a new message received by a paging controller is not an idle mode exit message (block 74-N), it may next be determined whether the received message requires paging to be performed (block 78). If the message does not require paging (block 78-N), then method 60 may return to block 64 and wait for a new message. If the message does require paging (block 78-Y), then a paging announcement message may be generated and broadcast within the corresponding paging group (block 80 in FIG. 4). The paging announcement message may be an aggregated paging message that involves multiple idle mode users within the paging group (all of which are in the same paging set). In one approach, an aggregated paging announcement message is generated that corresponds to paging requests that arrive within a paging generation interval. A paging generation interval can be as small as a fraction of the paging cycle and as large as the entire paging cycle. If an idle mode user that is a subject of the page now leaves the idle mode to become active, the user's entry is removed from the corresponding paging set. The method 60 may then return to block 64 and wait for a new message to be received.

Figure 5:
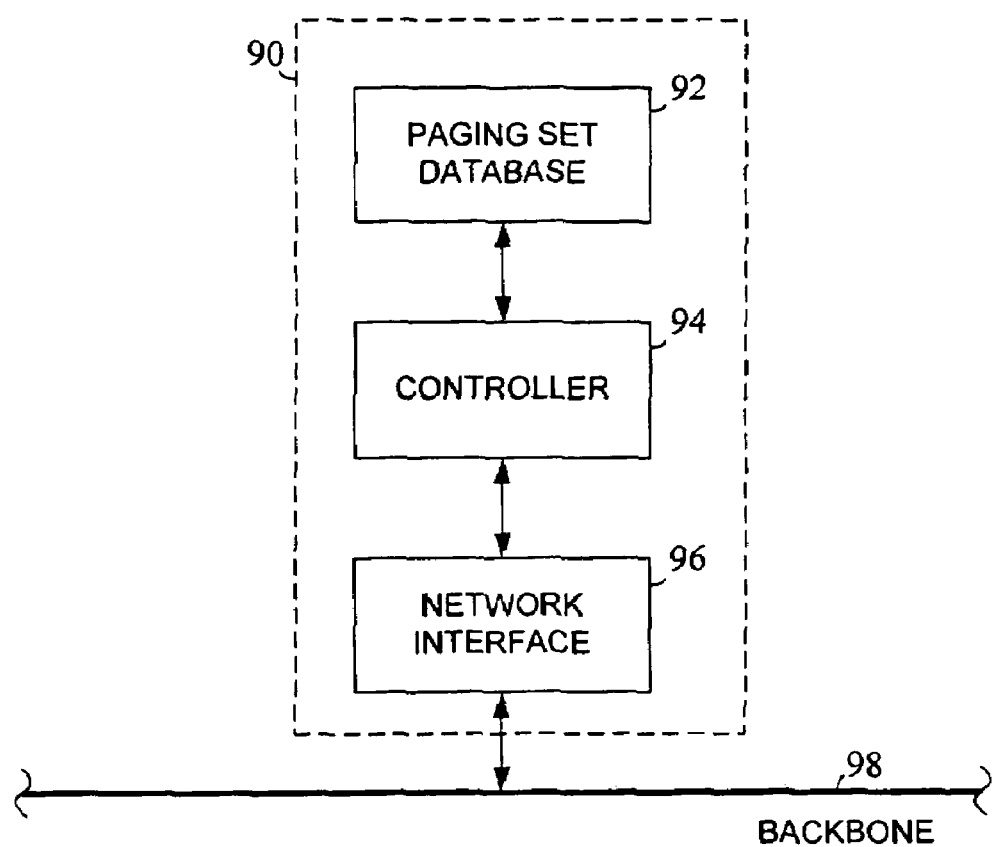
FIG. 5 is a block diagram illustrating an example paging controller in accordance with an embodiment of the present invention.

FIG. 5 is a block diagram illustrating an example paging controller 90 in accordance with an embodiment of the present invention. The paging controller 90 may be used within a wireless network to manage paging activity and idle mode operation within a paging group of the network. The paging controller 90 may take the form of a separate server unit that can be coupled to a network backbone 98 (as illustrated in FIG. 5) or it can be part of another device, component, or system within the network (e.g., a base station, a server, etc.). As shown in FIG. 5, the paging controller 90 may include a paging set database 92, a controller 94, and a network interface 96. The network interface 96 provides an interface between the paging controller 90 and the corresponding network backbone 98. In the illustrated embodiment, the network interface 96 provides an interface to a wired network backbone 98 within the network. In some other embodiments, the network interface 96 is a wireless device that provides a wireless interface with the corresponding network. The paging set database 92 stores information related to the plurality of paging sets that are defined for use within the associated paging group. That is, the paging set database 92 may include storage locations to store identification information related to idle mode users in the paging group that are assigned to the various paging sets. Any type of digital memory or mass storage device can be used to store data for the paging set database 92. In at least one embodiment, the controller 94 and the paging set database 92 are implemented on a common semiconductor chip. Other configurations may alternatively be used.

In at least one embodiment, the controller 94 will calculate a maximum number of idle mode users that will be allowed within each paging set. As described previously, this number may be calculated based on a maximum paging latency that is acceptable within the corresponding paging group. That is, a number N will be generated that will allow some level of aggregation to be achieved while not exceeding a given level of paging latency. The number of paging sets tracked within the paging set database 92 will typically be a function of the paging cycle duration and the paging listening interval duration used within the paging group. The controller 94 is able to receive messages from, and send messages to, the network through the network interface 96. The controller 94 can communicate with, for example, the BSs of the paging group through the network interface 96.

The controller 94 will designate one of the paging sets within the paging set database 92 as the current paging set. When the controller 94 receives an idle mode initiation message from the network, the controller 94 may add an associated SS to the current paging set by storing identification information (e.g., a MAC address, etc.) in an appropriate location within the paging set database 92. If the current paging set has reached the maximum number (N) of idle mode users, then the controller 94 may select a new current paging set for use in the paging group. To do this, the controller 94 may first search the paging set database 92 for an active paging set that has less than N idle mode users. If no such set exists, the controller 94 may select an empty paging set within the database 92 as the new current paging set. If the controller 94 receives an idle mode exit message, then the controller will remove a corresponding entry from the paging set database 92. When paging is to be performed, the controller 94 may cause a paging signal to be broadcast within the paging group at the appropriate paging offset. If an idle mode user then becomes active as a result of the broadcast paging signal, then the controller 94 may remove the user from the paging set database 92. If an idle mode user within the associated paging group moves to a neighboring paging group, the controller 94 may remove the user from the paging set database 92. In at least one embodiment, the controller 94 is implemented using one or more digital processing devices. The digital processing device(s) may include, for example, a general purpose microprocessor, a digital signal processor (DSP), a reduced instruction set computer (RISC), a complex instruction set computer (CISC), a field programmable gate array (FPGA), an application specific integrated circuit (ASIC), and/or others, including combinations of the above. Hardware, software, firmware, and hybrid implementations may be used.

As described above, when an idle mode user is transitioning from one paging group to another, the above-described method may be used to delete the idle mode user from a paging set in the first paging group and to add the idle mode user to a paging set in the new paging group. In addition, it should be appreciated that the techniques described above are not limited to use in paging applications, but may be used in connection with other management related signaling functions in a wireless network.

In the above description, language is used that is often associated with the IEEE 802.16 wireless networking standard. It should be appreciated, however, that the inventive techniques are not limited to use within networks following IEEE 802.16. That is, features of the invention may be used in any wireless network where it is desirable to aggregate messages to a number of users in a single broadcast message without exceeding a particular level of latency. As described above, this aggregation may be used to perform paging and other network management related functions.

The techniques and structures of the present invention may be implemented in any of a variety of different forms. For example, features of the invention may be embodied within paging controllers; base stations; access points; servers; laptop, palmtop, desktop, and tablet computers having wireless capability; personal digital assistants having wireless capability, cellular telephones and other handheld wireless communicators; network interface cards (NICs) and other network interface structures, integrated circuits, electronic modules, as instructions and/or data structures stored on machine readable media, and/or in other formats. Examples of different types of machine readable media that may be used include floppy diskettes, hard disks, optical disks, compact disc read only memories (CD-ROMs), digital video disks (DVDs), Blu-ray disks, magneto-optical disks, read only memories (ROMs), random access memories (RAMs), erasable programmable ROMs (EPROMs), electrically erasable programmable ROMs (EEPROMs), magnetic or optical cards, flash memory, and/or other types of media suitable for storing electronic instructions or data.

In the foregoing detailed description, various features of the invention are grouped together in one or more individual embodiments for the purpose of streamlining the disclosure. This method of disclosure is not to be interpreted as reflecting an intention that the claimed invention requires more features than are expressly recited in each claim. Rather, as the following claims reflect, inventive aspects may lie in less than all features of each disclosed embodiment.

Although the present invention has been described in conjunction with certain embodiments, it is to be understood that modifications and variations may be resorted to without departing from the spirit and scope of the invention as those skilled in the art readily understand. Such modifications and variations are considered to be within the purview and scope of the invention and the appended claims.

What is claimed is:

1. A method comprising:
defining a plurality of paging sets within a paging group in a wireless network, wherein a paging set is a set for idle mode users in said paging group that perform paging at a common paging offset value within a paging cycle, wherein different paging sets in said plurality of paging sets perform paging at different paging offset values;
obtaining a value for a maximum number of idle mode users (N) that can be within a paging set;
when an idle mode initiation message is received, adding a user associated with said idle mode initiation message to a current paging set, said current paging set being a set within said plurality of paging sets that is designated for receipt of a new idle mode user; and
designating another set within said plurality of paging sets as the current paging set when said current paging set achieves N idle mode users.

2. The method of claim 1, wherein:
obtaining a value for a maximum number of idle mode users (N) that can be within a paging set includes calculating a value N based on a maximum paging latency (T) specified for the wireless network.

3. The method of claim 2, wherein:
calculating a value N includes calculating a value N so that N×p/K users contending within a cell in the paging group will not result in a paging latency greater than T, wherein p is a probability that an idle mode user can be paged within a paging generation interval and K is a number of cells within the paging group.

4. The method of claim 1, wherein:
said plurality of paging sets can include active paging sets and empty paging sets, each active paging set having at least one idle mode user and each empty paging set having no idle mode users.

5. The method of claim 4, wherein:
designating another set includes designating an active paging set as the new current paging set when said plurality of paging sets includes an active paging set having less than N idle mode users.

6. The method of claim 4, wherein:
designating another set includes designating an empty paging set as the new current paging set when said plurality of paging sets does not include an active paging set having less than N idle mode users.

7. The method of claim 1, further comprising:
when an idle mode exit message is received, identifying a paging set within said plurality of paging sets that includes an idle mode user associated with said idle mode exit message; and
removing said an idle mode user associated with said idle mode exit message from said identified paging set.

8. The method of claim 1, further comprising:
when a message is received that requires paging to be performed:
causing a paging message to be broadcast within the paging group at an appropriate paging offset; and
when said paging message results in an idle mode user changing to active mode, removing said idle mode user from a corresponding paging set.

9. The method of claim 1, further comprising:
generating an aggregated paging message to be transmitted at a particular offset value in a paging cycle, said aggregated paging message corresponding to multiple paging requests received within a paging generation interval for idle mode users within a paging set associated with said particular offset value.

10. The method of claim 1, further comprising:
when an idle mode user moves from a current paging group to another paging group, removing said idle mode user from a corresponding paging set in the current paging group.

11. An apparatus comprising:
a paging set database to store information about a plurality of paging sets within a paging group of a wireless network, wherein a paging set is a set of idle mode users in said paging group that perform paging at a common paging offset value within a paging cycle, wherein different paging sets in said plurality of paging sets perform paging at different paging offset values; and
a controller to manage the paging set database, said controller to:
designate a paging set within said plurality of paging sets as a current paging set into which a new idle mode user will be placed;
when an idle mode initiation message is received by said controller, add the user associated with said idle mode initiation message to said current paging set; and
designate another set within said plurality of paging sets as the current paging set when said current paging set achieves N idle mode users, where N is a maximum number of idle mode users that can be within a paging set.

12. The apparatus of claim 11, wherein:
said controller is to calculate a maximum number of idle mode users (N) to be placed in each paging set in said plurality of paging sets, wherein said controller calculates said maximum number of idle mode users based on a maximum paging latency that is acceptable within the corresponding paging group.

13. The apparatus of claim 11, wherein:
said controller is to remove an idle mode user from a corresponding paging set when said paging announcement message results in said idle mode user switching to active mode.

14. The apparatus of claim 11, wherein:
said plurality of paging sets can include active paging sets and empty paging sets, each active paging set having at least one idle mode user and each empty paging set having no idle mode users.

15. The apparatus of claim 14, wherein:
said controller is to change the paging set being used as the current paging set to an active paging set when said plurality of paging sets includes an active paging set having less than N idle mode users.

16. The apparatus of claim 14, wherein:
said controller is to change the paging set being used as the current paging set to an empty paging set when said plurality of paging sets does not include an active paging set having less than N idle mode users.

17. The apparatus of claim 11, wherein:
said controller is to remove an idle mode user from a corresponding paging set when an idle mode exit message is received.

18. The apparatus of claim 11, wherein:
said controller is to cause a paging announcement message to be broadcast within the paging group, at a particular paging offset, when a message is received that requires paging.

19. The apparatus of claim 18, wherein:
when said current paging set has N idle mode users, designating another set within said plurality of paging sets, that includes less than N idle mode users, as the current paging set.

20. The apparatus of claim 11, wherein:
said controller is to cause an aggregated paging announcement message to be broadcast within the paging group, at a particular paging offset, when multiple paging requests are received for idle mode users within an associated paging set of the paging group within a paging generation interval.

21. An article comprising a computer readable storage medium having instructions stored thereon that, when executed by a computing platform, operate to:
define a plurality of paging sets within a paging group in a wireless network, wherein a paging set is a set for idle mode users in said paging group that perform paging at a common paging offset value within a paging cycle, wherein different paging sets in said plurality of paging sets perform paging at different paging offset values;
obtain a value for a maximum number of idle mode users (N) that can be within a paging set;
when an idle mode initiation message is received, add a user associated with said idle mode initiation message to a current paging set, said current paging set being a set within said plurality of paging sets that is designated for receipt of a new idle mode user; and
designate another set within said plurality of paging sets as the current paging set when said current paging set achieves N idle mode users.

22. The article of claim 21, wherein:
operation to obtain a value for a maximum number of idle mode users (N) that can be within a paging set includes calculation of a value N based on a maximum paging latency that is acceptable within the corresponding paging group.

23. The article of claim 21, wherein:
said controller is to determine the number of paging sets within said plurality of paging sets based on a paging cycle duration and a paging listening interval duration of said paging group.

24. A system comprising:
a paging set database to store information about a plurality of paging sets within a paging group of a wireless network, wherein a paging set is a set of idle mode users in said paging group that perform paging at a common paging offset value within a paging cycle, wherein different paging sets in said plurality of paging sets perform paging at different paging offset values;
a controller to manage the paging set database, said controller to:
designate a paging set within said plurality of paging sets as a current paging set into which a new idle mode user will be placed;
when an idle mode initiation message is received by said controller, add a user associated with said idle mode initiation message to said current paging set; and
designate another set within said plurality of paging sets as the current paging set when said current paging set achieves N idle mode users, where N is a maximum number of idle mode users that can be within a paging set; and a network interface to couple said system to a wired network medium within said wireless network.

25. The system of claim 24, wherein:

said controller is to calculate a maximum number of idle mode users (N) to be placed in each paging set in said plurality of paging sets, wherein said controller calculates said maximum number of idle mode users based on a maximum paging latency that is acceptable within the corresponding paging group.

26. The system of claim 24, wherein:

said controller is to determine the number of paging sets within said plurality of paging sets based on a paging cycle duration and a paging listening interval duration of said paging group.

* * * * *

UNITED STATES PATENT AND TRADEMARK OFFICE
CERTIFICATE OF CORRECTION

PATENT NO. : 7,636,577 B2  Page 1 of 1
APPLICATION NO. : 11/263410
DATED : December 22, 2009
INVENTOR(S) : Mohanty et al.

It is certified that error appears in the above-identified patent and that said Letters Patent is hereby corrected as shown below:

In column 9, line 44-47, in Claim 13, delete "said controller is to remove an idle mode user from a corresponding paging set when said paging announcement message results in said idle mode user switching to active mode." and insert -- said controller is to determine the number of paging sets within said plurality of paging sets based on a paging cycle duration and a paging listening interval duration of said paging group. --, therefor.

In column 10, line 7-10, in Claim 19, delete "when said current paging set has N idle mode users, designating another set within said plurality of paging sets, that includes less than N idle mode users, as the current paging set." and insert -- said controller is to remove an idle mode user from a corresponding paging set when said paging announcement message results in said idle mode user switching to active mode. --, therefor.

In column 10, line 45-48, in Claim 23, delete "said controller is to determine the number of paging sets within said plurality of paging sets based on a paging cycle duration and a paging listening interval duration of said paging group." and insert -- when said current paging set has N idle mode users, designating another set within said plurality of paging sets, that includes less than N idle mode users, as the current paging set. --, therefor.

Signed and Sealed this

Twenty-third Day of March, 2010

David J. Kappos
*Director of the United States Patent and Trademark Office*

UNITED STATES PATENT AND TRADEMARK OFFICE
CERTIFICATE OF CORRECTION

PATENT NO.        : 7,636,577 B2
APPLICATION NO. : 11/263410
DATED             : December 22, 2009
INVENTOR(S)       : Mohanty et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 773 days.

Signed and Sealed this

Twenty-first Day of December, 2010

David J. Kappos
*Director of the United States Patent and Trademark Office*